March 24, 1931.  W. M. JORDAN  1,797,234

FISHING LURE

Filed April 30, 1928

Inventor

W. M. Jordan

By Johnston & Jennings  Attorneys

Patented Mar. 24, 1931

1,797,234

UNITED STATES PATENT OFFICE

WILLIAM M. JORDAN, OF BIRMINGHAM, ALABAMA

FISHING LURE

Application filed April 30, 1928. Serial No. 273,849.

My invention relates to certain new and useful improvements in fishing tackle, particularly lures, and has for its objects to simplify and perfect the construction and manner of mounting of spinners on their shanks and of connecting the line and the hook or fly to such shanks.

My invention further comprises improvements in spinners mounted to rotate on the spinner shank and contemplates forming them of metal shaped to provide flat faces which slope from an apex which is perforated for the passage of the shank, the sloping faces being shaped in whole or in part to produce the rotation of the spinner against the resistance of water. Preferably the spinner takes the form of a regular pyramid with each of its sides extended at an angle to the imaginary base thereof, thereby to form the driving portion of the blade, each such extension preferably lying in the same plane with its respective side of the pyramid. A regular three sided pyramid has proven very satisfactory as it lends itself readily to the stamping and hand bending of the blank and affords a very satisfactory pitch for the blades.

My invention further comprises improvements in the manner of mounting the hook or fly on the spinner shank so as to provide a semi-rigid joint which will permit the hook or fly to slide up or turn about the spinner shank when necessary and which will hold the hook against sagging which is objectionable because it permits the hook to give from the strike and it detracts from the life-like appearance of the lure.

This semi-rigid mounting has a further advantage in connection with spinners adapted to reverse as the hook sinks, in that it provides against the hook engaging and arresting the rotation of the sinking spinner. It also simplifies manufacture as it dispenses with a bottom loop on the spinner shank.

My invention further contemplates improvements in the top loop of the spinner shank which is characterized by the provision of an eye for the line formed by a double loop terminating in a free end adapted to engage the shank preferably with a spring action. The loop eye thus formed serves better to confine the line and it affords a wider and more satisfactory bearing for the line having a double width of the shank wire. Another advantage of the loop eye is that there will be no tendency for the spinner shank or fly to foul the line during the cast which may occur where the line loop can work down into the crotch of the existing top loops.

My invention further contemplates the provision of a novel counter-line-twisting device for spinners and comprises a flat blade preferably of approximately triangular shape, with an eye at the top for the line and with its base formed with a connection for the spinner shank and shaped to provide one or more blades which will, responsive to the resistance of water, tend to rotate in a different direction counter to that of the spinner and with a force sufficient to overcome the friction of the spinner mounting and thereby to prevent the line becoming twisted. This constitutes one improvement on the construction forming the subject matter of my pending application, Serial No. 203,448.

My invention comprises improvements in a safety snap fastening on the spinner shank for the hook which will eliminate the chance of losing the hook, fly or fish, and which has the advantage of a cross over to form a completed loop for the hook eye, the free end of the fastening being adapted to engage the shank with a spring action thereby avoiding the wrapping of the free end around the shank as now practiced in the most successful fastenings and which has objections inherent in the difficulty of securing and detaching such a wrapped fastening.

My invention further comprises the novel details of construction and arrangements of parts which are hereinafter more particularly described and claimed, reference being had to the accompanying drawings which form a part hereof, and in which:—

Fig. 4 is a side view showing the spinner shank having a semi-rigid slip connection for the hook and a counter-line-twisting blade.

Fig. 5 is a detail view showing more clearly the manner of connecting the hook to the spinner shank as shown in Fig. 4.

Fig. 6 is a detail view illustrating the safety snap fastening for connecting the hook to the spinner shank.

Fig. 7 is a detail view of the bearing washer for the spinner.

Similar reference numerals refer to similar parts throughout the drawings.

Figure 1:
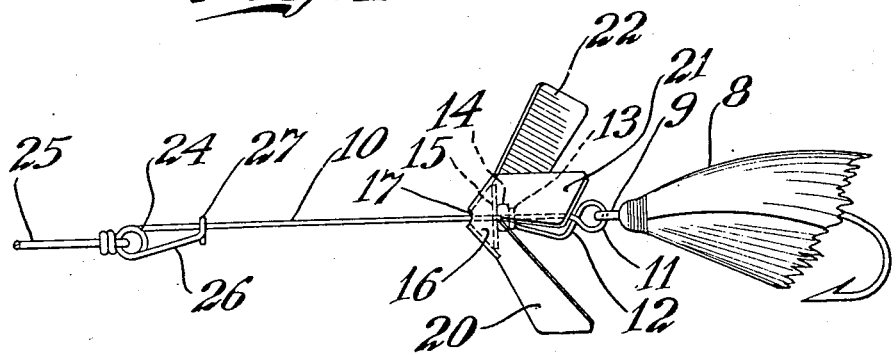
Fig. 1 is a side view of a lure showing my improved type of spinner mounting.
Figure 2:
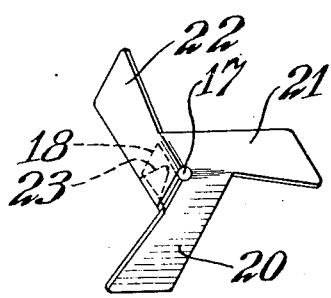
Fig. 2 is a detail plan view of the spinner.
Figure 3:
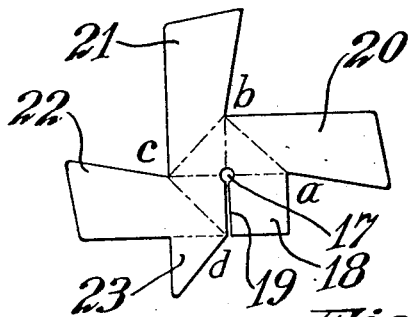
Fig. 3 is a view showing the spinner blank.
Figure 3:
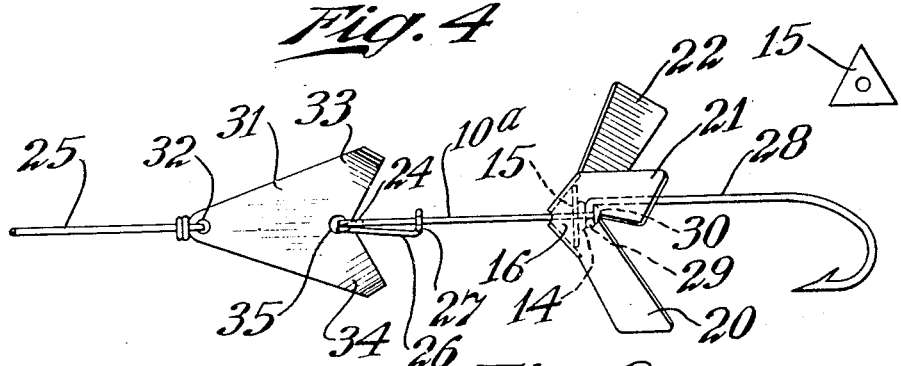
Figure 3:
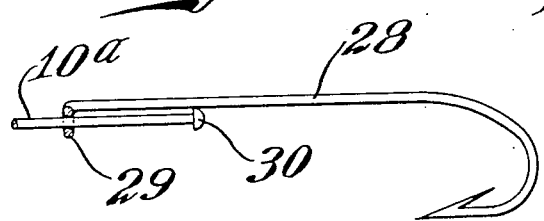

In the embodiment of my invention illustrated in Fig. 1, I show a lure as comprising a fly 8 of any conventional type having its hook eye 9 mounted in my improved type of safety snap fastening provided at the lower end of the spinner shank or wire leader 10. This fastening, as shown more clearly in Fig. 6, is formed by bending the shank to form a complete loop 11 with the free end portion 12 crossing the shank and then bent upwardly and shaped to provide a shank engaging clasp 13. The portion 12 is so formed as to require it to be brought under tension before the clasp 13 can be snapped over the shank, which is its normal operating position. The crossing of the shank 10 by its portion 12 maintains the loop 11 closed and gives a very secure fastening, at the same time permitting the clasp 13 to be readily unfastened and the loop opened for the mounting or removal of the hook. The usual bearing bead 14 is mounted loosely on the shank 10 so as to rest on the clasp 13 when the latter is engaged with the shank, and this bead supports a bearing washer 15 shaped to conform to the cross-section of the portion it engages of a hollow spinner body 16. This spinner, as shown more clearly in Figs. 2 and 3, is of a pyramidal shape and can be formed very simply and easily by hand, if such be desired, by the provision of a blank having a central opening 17 for the spinner shank 10 and having its body portion proper formed by the metal lying between the lines a, b, c and d (Fig. 3), which lines define the bases of the triangular sides of a three sided regular pyramid which is employed to typify the spinner contemplated in my invention. A flap 18 is provided, representing a fourth triangular side of the blank and on one side it is separated by a slot 19 leading to the hole 17.

The side of the pyramid terminating in the base line a—b has an angularly disposed spinner blade 20 carried thereby, the long axis of this blade being at an acute angle to the base line a—b. In like manner the adjacent side of the pyramid is provided with a blade 21 disposed at a corresponding angle to the base defined by the line b—c. The remaining side of the pyramid carries a blade 22 disposed at a corresponding angle to the base defined by the line c—d. The edge of the blade 22 at right angles to the slot 19 carries a tip 23 which is adapted to be bent inwardly and over against the flap 18 when the latter has been bent under the side of the pyramid carrying the blade 22, as is shown in Fig. 2, it being here noted that this portion 18 is carried by the blade 20 and that the blank is bent along the lines leading from the points a, b and c, respectively, to the center opening 17. This results in the production of a flat sided regular pyramid terminating in the spinner blades which can have the desired pitch according to the speed of rotation desired and each spinner may have a greater number of sides if desired. Obviously, the spinner could be formed entirely mechanically but the form shown lends itself readily to inexpensive manufacture by hand.

The top loop of the shank is formed by bending the wire to provide more than one complete loop 24, the extra loop portion providing a wider or double bearing for the line 25. The free end 26 of the top loop is bent over and provided with a clasp 27, corresponding to 13.

Where it is desired to attach a hook to the spinner shank or leader 10 so that it will have a semi-rigid slip joint to prevent dangling, I prefer to use the construction shown in Figs. 4 and 5 in which the hook 28 has its eye 29 bent over at, or nearly at, right angles and adapted to fit with a snug sliding fit about the shank 10a, which in this instance terminates in a swivel head 30 instead of a snap fastening, as shown in Fig. 1. The snug fit of the eye 29 about the shank prevents the hook dangling substantially out of line with the shank and it permits it to slide up freely with the advantages heretofore pointed out.

Where it is desired to prevent the spinner twisting the line, I secure the top eye 24 of the shank or leader in a counter-line twisting plate 31 engaging it in a hole 35 in the center of the base of this plate. The line 25 is connected to a hole 32 at the top or apex of the plate and the side wings of the plate are preferably reversely flared and bent to form the blades 33 and 34, which are set and have a pitch angle which will tend to produce a counter-twist of the line 25 sufficiently strong to overcome the effect of the twist from the oppositely rotating spinner blades 16 and thus I protect the line from becoming twisted to an objectionable extent.

The spinner is free on the shank and will rotate freely when sinking or when being reeled or drawn through the water, the spinner readily centering itself on the bearing washer 15 which in turn will rotate on the bearing head 14. The entire surface of the spinner presents a minimum of resistance to the water and the maximum amount of blade area, thereby providing an exceedingly active spinner. I claim the novel features of its construction without regard to the number of blades or the manner of its manufacture.

Having thus described my invention, what I claim as new and desire to secure by Letters Patent, is:—

1. A fishing lure spinner having a flat sided hollow pyramidal body provided with a hole at its apex for the spinner shank and provided with a blade extension disposed at an angle to the imaginary base line of each triangular side of the spinner body.

2. A fishing lure spinner according to claim 1, in which each blade lies in the plane of its respective side of the pyramidal spinner body.

3. A fishing lure spinner according to claim 1, in which the spinner body is formed from a blank bent to dispose its sides in planes lying at an angle to and disposed symmetrically about its axis of rotation with the meeting side edges having tabs adapted to be bent inwardly into interlocked relation within the hollow body of the lure.

4. A fishing lure comprising a spinner having a symmetrical pyramidal body with base extensions forming blades, a shank for the spinner passing through the body's apex, and a bearing washer loose on the shank and shaped to be received in the hollow spinner body and engage the sides thereof.

5. A fishing lure comprising a hollow tapered spinner body having blade extensions at its base and a shank opening at its apex, a spinner shank, a bottom bearing for the spinner on the shank, and a washer loose on the shank and adapted to rest on the bearing and to be received in the spinner body, the washer conforming to the cross-section of the spinner body where it engages the latter to support it.

In testimony whereof I affix my signature.

WILLIAM M. JORDAN.